March 17, 1964 C. J. STRID 3,125,380
QUICK RELEASE PNEUMATIC CONTROL VALVE
Filed Aug. 21, 1961
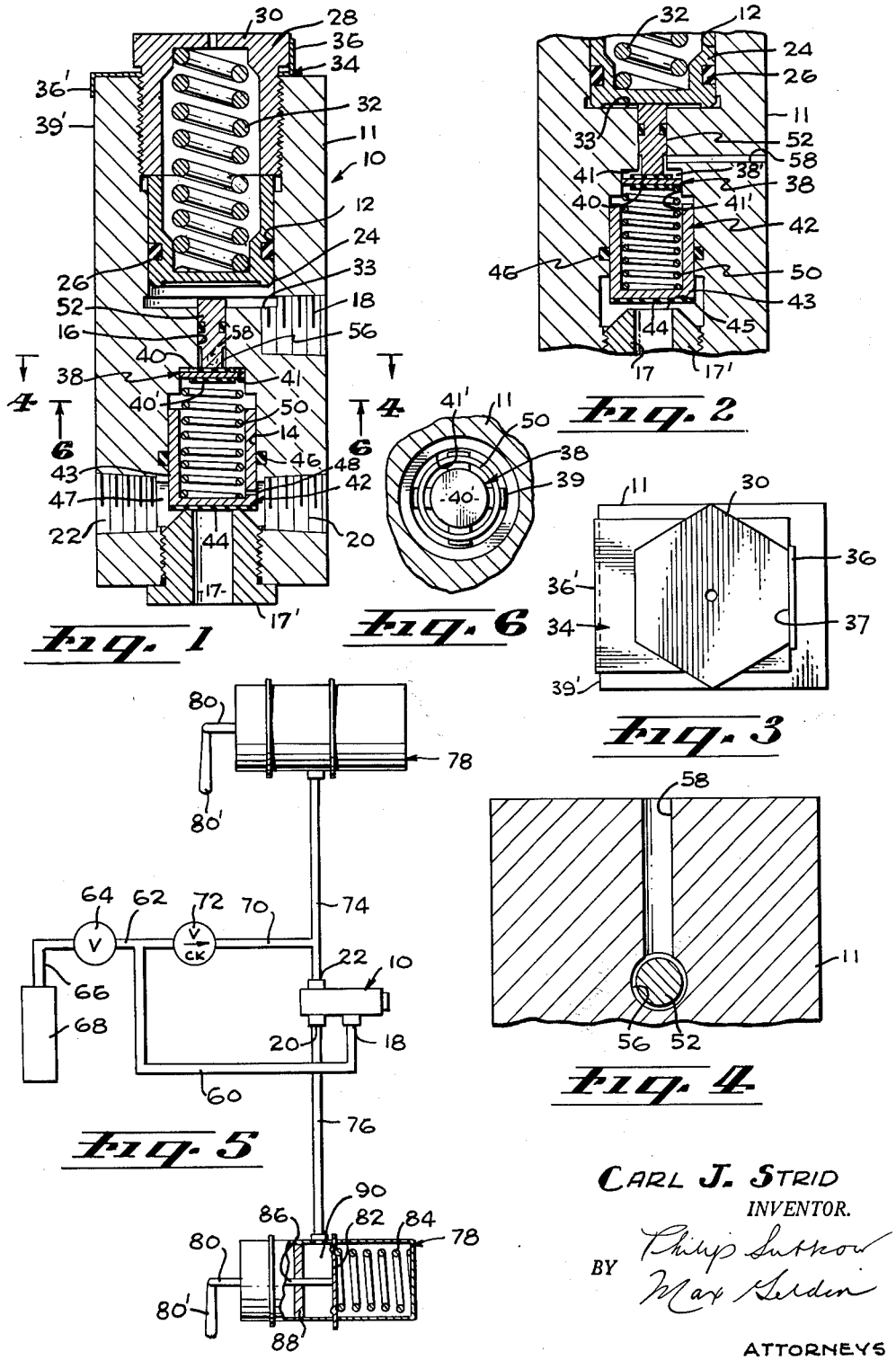
CARL J. STRID
INVENTOR.
BY Philip Subrow
Max Girden
ATTORNEYS

United States Patent Office 3,125,380
Patented Mar. 17, 1964

3,125,380
QUICK RELEASE PNEUMATIC CONTROL VALVE
Carl J. Strid, La Canada, Calif., assignor to Stratovalve & Engineering Company, Huntington Park, Calif., a corporation of California
Filed Aug. 21, 1961, Ser. No. 132,896
12 Claims. (Cl. 303—69)

This invention relates to a valve, particularly adapted for use with vehicle safety brakes, and is especially concerned with a valve which is designed quickly and automatically to operate a safety mechanism for applying vehicle brakes, when the control pressure normally employed to operate the vehicle brakes has fallen to a predetermined level or lower.

It is an object of the invention to provide a simple, reliable valve of the above type, which is adapted particularly for incorporation in a vehicle safety brake system, for example, of the type described in U.S. application Serial No. 90,797, now pending, filed February 21, 1961, of Dan B. Herrera, for actuation of such system at a preselected or lower air pressure.

Safety mechanisms or actuators of the type described in the above Herrera application are designed to operate when there is a reduction or failure of the fluid pressure in the conventional brake control system of a vehicle. However, in some instances the loss of pressure in the system may not be sufficiently great or may be so gradual that immediate actuation of the safety mechanism for full application of the brakes does not occur. Thus, a gradual reduction in pressure in the safety mechanisms of the above type only produces gradual application of the vehicle brakes, and the brakes are not fully applied until the pressure on the system is reduced to a predetermined value. Such gradual application of the brakes is undesirable not only from the standpoint of the time delay involved in setting the brakes, but particularly in causing overheating and burning out of the vehicle brakes. Thus, a particular object of this invention is the provision of a valve which, when employed in cooperation with such safety mechanism or similar mechanisms, will cause almost instantaneous and automatic actuation of the safety brake actuator when the brake control pressure falls to a preselected or lower level, without the above noted disadvantages.

A still further object of the invention is to provide a system incorporating such valve and a safety brake mechanism for efficient and automatic actuation of such mechanism at a preselected reduced air pressure in the system.

According to the instant invention, there is provided a valve having two ports, both of which are connected to a control air pressure source. The second port is also connected to a safety brake actuator, for example, of the type described in the above noted pending Herrera application. The air pressure from the control pressure source to the second port, and which is also applied to such safety brake actuator, is prevented from decreasing by the inclusion of a check valve in the line between the control pressure source and such second port. However, no such check valve is included between the control pressure source and the first port.

In one embodiment of the invention, the valve comprises a spring biased piston interconnected through a slidable spool to a first spring biased poppet adapted for movement in a poppet cavity. There is also located in the poppet cavity a second spring biased poppet arranged for slidable movement in the cavity. The first mentioned valve port communicates with one side of the piston, and the second valve port is in communication with the poppet cavity and with one side of both of the poppets via an orifice in the wall of the second poppet. When the air pressure is the same in both of the above noted ports of the valve, the piston is urged in a direction against the action of its biasing spring, such as to permit movement of the spool and the first mentioned poppet against one end of the poppet cavity, aided by the action of the cooperating poppet spring means. Air pressure entering the poppet cavity via the above noted orifice, forces both poppets against opposite ends of the poppet cavity to seat both poppets. Such seating of both poppets prevents any loss of pressure in the second port and in the safety brake actuator which is in communication with such second port.

However, on reduction of the control pressure in communication with the first port to a predetermined level as determined by the stiffness of the spring biasing the above noted piston, such spring urges the piston and the cooperating spool against one of the poppets with sufficient force to unseat such poppet. This results in a venting of the poppet cavity through an outlet in the valve body adjacent the spool, and the pressure in the second port, which is not reduced because of the presence of the check valve, produces an unbalanced pressure against the second poppet, which causes it to unseat. Such unseating of the second poppet results in a venting of the second port via a vent in the valve which is opened by the unseating of the second poppet, and an immediate reduction of the pressure in the safety brake actuator to approximately atmospheric pressure occurs. Such reduction in pressure in the actuator causes automatic operation of the actuator in the manner described in the above Herrera application, to apply the vehicle brakes.

The invention valve is preferably designed so that its action is in the nature of a snap action. That is, just as soon as the pressure in the brake control system drops to the above noted predetermined level or lower, the valve immediately operates to completely vent the air pressure in the safety brake actuator, causing the vehicle brakes to be applied almost instantaneously.

The invention will be understood more clearly from the description below of a preferred embodiment, when taken in connection with the accompanying drawings wherein:

FIG. 1 is a section in elevation of the invention valve, showing the poppets in normal seated position;

FIG. 2 is a partial section similar to FIG. 1, but taken in a plane rotated 90° from the plane of the section of FIG. 1, showing the poppets in unseated position;

FIG. 3 is a plan view of the valve of FIG. 1;

FIG. 4 is a horizontal section taken on line 4—4 of FIG. 1;

FIG. 5 is a schematic illustration of a system including the valve of FIGS. 1 to 4 arranged for operation of a vehicle safety brake mechanism or actuator, one of such actuators being shown partially broken away; and FIG. 6 is a horizontal section taken on line 6—6 of FIG. 1.

Referring particularly to FIGS. 1 to 4 and 6 of the drawing, numeral 10 generally represents the valve of the invention, such valve comprising a valve body 11 having formed in one end portion of the valve body a large cavity 12 and in the other end portion a smaller cavity 14. Between cavities 12 and 14 is a narrow interconnecting cavity 16. A port 18 is provided in the valve body 11 at approximately the central portion thereof, such port communicating with the inner end of cavity 12. In the lower end of the valve body 11 opposite the lower end of cavity 14 are positioned a pair of ports 20 and 22 which are disposed diametrically opposite each other, each of such ports 20 and 22 communicating with the cavity 14. A fitting 17' having a bore 17 is threadably engaged in the lower end of cavity 14, providing a vent which communicates with the cavity 14. It will thus be seen that fluid pressure communication is provided from ports 20 and 22 to vent 17 via an annulus 47 around the lower end of cavity 14 and the cavity 14.

Mounted for axially slidable movement in the large cavity 12 is a hollow piston 24 having an O-ring seal 26 mounted in the lower side wall thereof for sliding contact with the inner wall of bore 12. A cap 28 is threadably mounted in the outer end of cavity 12 opposite the piston 24, the cap having a hexagonal head 30 for manipulation of the cap so as to set the same in a desired axial position within cavity 12, as will be described more fully below. A spring 32 is positioned within piston 24 and cap 28, the opposite ends of the spring abutting the lower end of piston 24 and the head 30 of the cap. It will be seen that the spring 32 urges the piston 24 downwardly toward the adjacent horizontal shoulder 33 formed in the interior of valve body 11. The force applied by the spring 32 against the piston 24 is adjusted by turning the head 30 of the cap 28, and when the cap reaches the desired position with respect to the piston for applying the desired downward force against the piston, the cap is set by bending the lip portion 36 of a lock washer 34 positioned at the upper end of the valve body, upwardly so that the lip 36 cams against the adjacent surface 37 of the head of the cap and prevents rotation thereof, the washer being bent downwardly at its opposite end 36' against the side 39' of the valve body to hold the washer in fixed position.

Positioned within the smaller cavity 14 are a first poppet 38 and a second poppet 42 which are urged against their respective adjacent seats by a compression spring 50 which is substantially weaker than the above noted compression spring 32 which actuates the piston 24. The first smaller poppet 38 carries a gasket 40 on one face which is adapted to seat against an internal shoulder 41 of the valve body 11 adjacent the lower end of the interconnecting cavity 16. The poppet 38 carries a plurality, shown as 4 in number, of outwardly extending lugs 39 (see FIG. 6) against which one end of the spring 50 is positioned. Poppet 38 carries another gasket 40' to serve as a spring centering element for the spring 50. The outer ends of these lugs are positioned closely adjacent to but in slidable relation with the wall of the counterbore 41' of cavity 14, thus permitting and guiding axial motion of the poppet 38 in such counterbore.

The larger poppet 42 is in the form of a hollow piston having an integral cylindrical wall portion 43 slidably fitting in cavity 14, and an O-ring seal 46 is provided in the wall of cavity 14 adjacent cylinder 43, although such ring seal may be deleted, if desired. The spring 50 is positioned within the cylindrical poppet 42, and an end of the spring is positioned against the end of the poppet 42, normally urging the poppet, which has a gasket 44 fixed to the lower surface thereof, against a valve seat 45 formed at the upper end of the vent fitting 17'. An orifice 48 is provided in the lower end of the cylindrical wall 43 of the poppet 42, providing fluid communication from ports 20 and 22, the annulus 47 around the poppet 42, to the cavity 14 interiorly of the poppet 42.

A spool 52 is positioned for slidable movement in the interconnecting cavity 16 which communicates with cavities 12 and 14. The lower end of spool 52 remains at all times in contact with the poppet 38. However, the other end of spool 52 is separated from the end of piston 24 when the latter is in the raised position shown in FIG. 1, but such end of the spool is in contact with said piston in the lower position thereof, shown in FIG. 2. It will be seen in FIG. 1 that the length of spool 52 is somewhat greater than the axial length of the cavity 16 so that when the piston 24 is forced downwardly into contact with the adjacent shoulder 33 of the valve body, the lower end of spool 52 will be forced into cavity 14, and the poppet 38 will be unseated, as shown in FIG. 2. It will be seen that spool 52 has a recess 56 formed around the lower end of the spool, so that when the poppet 38 is unseated or spaced from shoulder 41, fluid communication will be provided between cavity 14 and the annular recess 56, and via such recess though an outlet 58 in the valve body 11, to the atmosphere.

In operation, let us assume that equal pressures are applied in port 18 and in ports 20 and 22. The pressure in port 18 acts against the underside of piston 24 to compress spring 32 and urge the underside of the piston away from the shoulder 33, and moving the piston upwardly until it makes contact with the lower end of cap 28. Through the action of spring 50, poppet 38 and spool 52 are moved upwardly permitting poppet 38 to seat as shown in FIG. 1, thus closing communication of the outlet port 58 with the interior cavity 14. The pressure in ports 20 and 22 is bled to the interior of cavity 14 via the orifice 48, and such pressure in cavity 14, aided by the action of spring 50, maintains the poppet 42 in position against its seat 45, and also functions to maintain the poppet 38 against its seat. When poppet 42 is thus seated, this closes off communication between the ports 20 and 22 and the vent 17.

Now assume that the pressure in port 18 decreases while the pressure in ports 20 and 22 remains at its original level. As the pressure drops in port 18, spring 32 forces piston 24 down against the adjacent end of spool 52, pushing the spool 52 against the poppet 38. At a predetermined drop in pressure at port 18, which is determined by the strength of the spring 32 and the setting of such spring by the cap 28, poppet 38 unseats and moves down to the position shown in FIG. 2, while piston 24 also moves down until it rests on shoulder 33, as seen in FIG. 2. Such unseating of poppet 38 vents cavity 14, via the recess 56 in the spool and the outlet 58. This quickly reduces the pressure in cavity 14, since such pressure cannot be maintained by the pressure in ports 20 and 22 via the orifice 48, since such orifice is of small diameter and is in the nature of a bleeder. Thus, on reduction of the pressure in cavity 14, the pressure in ports 20 and 22 against the underside of the outer portion of the poppet 42 forces the poppet upwardly against the action of spring 50, thus unseating poppet 42 and providing fluid communication between ports 20 and 22 and the vent 17, as seen in FIG. 2. This quickly reduces the pressure in ports 20 and 22 to atmospheric pressure.

The valve is preferably especially designed so that the action of the valve in venting ports 20 and 22 to atmospheric pressure is essentially a snap action, which occurs almost simultaneously with the reduction of pressure in port 18 to a predetermined level and the consequent unseating of poppets 38 and 42. The chief reason for this is that when the pressure in cavity 14 drops as result of the initial unseating of poppet 38 by piston 24, this drop in pressure reduces the load acting against spring 32, causing this spring to snap the poppet 38 open.

When the pressure in port 18 is again built up to a value exceeding a predetermined level, such pressure acting against the underside of piston 24 raises the piston against the action of spring 24, and such motion together with the compressive action of spring 50, moves the poppet 38 upwardly to its seated position shown in FIG. 1, thus closing off communication between the cavity 14 and the outlet 58. In the unseated position of poppet 42 illustrated in FIG. 2, the orifice 48 remains in communication with ports 20 and 22, and pressure also simultaneously applied in ports 20 and 22 is bled through the orifice 48 into cavity 14. Such action, aided by the compressive force of the spring 50, again seats the poppet 42, as shown in FIG. 1, thus closing off ports 20 and 22 from the vent 17.

FIG. 5 illustrates the preferred use of the valve 10 in a system for operating a safety brake mechanism for applying the brakes of a vehicle automatically on a reduction of the control pressure in the system to a predetermined level. Supply pressure is applied to this system from a supply reservoir 68 which is connected via a supply line 66 to a control valve 64, which may be mounted in the cab of the vehicle. Valve 64 applies the desired control pressure to the system via line 62. A line 60 connects line 62 with the port 18 of valve 10, and a line 70 connects the control pressure line 62 with a line 74 which, in turn, communicates with the ports 20 and 22 of the valve 10 via the annulus 47. Fluid pressure from the control pressure line 62 enters line 70 via a check valve 72 which thus maintains the control pressure in ports 20 and 22 regardless of any loss in pressure in lines 62 and 60 upstream of valve 72. For this purpose it is apparent that the downstream side of check valve 72 is connected only to ports 20 and 22 via line 70, and the upstream side of check valve 72 is connected only to port 18 via line 60.

Ports 20 and 22 are each placed in fluid communication via lines 76 and 74 respectively, with two separate emergency brake actuators both indicated generally by the numeral 78. Each of these actuators is arranged to operate the brake for one wheel, so that the two actuators illustrated, are connected to the brake mechanisms of two separate wheels of the vehicle. Each such actuator is of the same construction and may be, although not necessarily, of the type shown and described in the above noted application of Herrera. Such actuators are designed so that when control pressure is applied via the lines indicated at 76 and 74 to such actuators, they remain inactive and do not cause any movement or operation of the brake rod, indicated at 80, and the interconnected pivoted connection 80' for setting the brakes. In the case, for example, of the actuator described in the above noted Herrera application, such actuator comprises a diaphragm 82 and a compression spring 84 positioned against one side of the diaphragm. The diaphragm has a connection 86 to the brake rod 80, such connection being slidably mounted for passage through a plate 88 which closes off that portion of the actuator between elements 82 and 88 and forming a pressure chamber 90 therebetween. The structure of the actuators shown in FIG. 5 is merely intended as illustrative, since such actuator per se is not a part of the present invention. Reference should be made to the above Herrera application for the structural details of the actuator and its mode of operation for a clearer understanding thereof.

Briefly, when control pressure is applied in lines 76 and 74, the spring 84 in the actuators is compressed by the pressure applied in chamber 90 against the opposite face of diaphragm 82, and the brake rod 80 is not actuated. On the other hand, when the pressure supplied by lines 74 and 76 is substantially reduced, spring 84 actuates the associated diaphragm 82, resulting in movement of connection 82 and the brake rod indicated at 80, sufficiently to set the brakes.

Thus it is seen that valve 10, when employed in the system shown in FIG. 5, can be designed so that when the control pressure in line 60 upstream of the check valve 72 is reduced to a preselected level, say of 45 pounds per square inch or lower, which reduction in pressure may be caused by a broken line, a faulty compressor or by some other cause, the resulting almost instantaneous unseating of the poppet 42, as described above, vents the pressure in the control pressure lines 74 and 76 via vent 17 of the valve, causing operation of the emergency brake actuator as previously described, to set the emergency brakes.

It is noted that the opening or orifice 48 in poppet 42 should be smaller and preferably substantially smaller than each of the outlet 58 and the opening 38' provided around poppet 38 when the latter is unseated as shown in FIG. 2, so that the pressure in cavity 14, is quickly reduced when poppet 38 is unseated, to provide the above noted snap action, and also to cause unbalance of the pressure against poppet 42, resulting in the quick unseating of poppet 42 and venting of ports 20 and 22 through vent 17.

In the specific embodiment described herein, I have shown two ports 20 and 22 for connection to two actuators 78. However, it will be obvious that the valve may have only one such port, or it may have three or more such ports, each operating a separate actuator or safety mechanism for control of three or more vehicle wheels.

Further, although I have shown both poppets 38 and 42 interconnected by a common biasing spring 50 for ease of manufacture, I may instead employ separate independent biasing springs for each of poppets 38 and 42.

Also, although I have shown the upper poppet 38 as being smaller than the lower poppet 42, if desired, the poppets 38 and 42 can be of the same size, or poppet 42 can be made smaller than poppet 38.

It will be understood, of course, that although I have described above the application of the valve of the invention in a system for operating a safety brake mechanism for actuation of vehicle brakes, such valve has other applications wherever it is desired to control the operation of a mechanism supplied by fluid pressure, so as to remove such pressure quickly when the control pressure in the system falls below a predetermined level.

While I have described particular embodiments of my invention for purposes of illustration, it should be understood that various modifications and adaptations thereof may be made within the spirit of the invention and within the scope of the appended claims.

I claim:

1. A valve which comprises a valve body, means forming a first cavity in said valve body, a biased piston mounted for slidable movement in said first cavity, a first port in said valve body communicating with said first cavity on one side of said piston, means forming a second cavity in said valve body, an outlet from said valve body, a biased valve means between said second cavity and said outlet, a positive mechanical connection between said piston and said valve means, a second port in said valve body, a vent in said valve body in fluid communication with said second port, a biased hollow piston type valve means in said second cavity between said second port and said vent, and an opening in said hollow piston type valve means providing fluid communication between said second port and said second cavity, said opennig being smaller than said outlet.

2. A valve as defined in claim 1, including means forming a third cavity in said valve body between said first and second cavities, said outlet communicating with said third cavity, said connection between said piston and said valve means being a spool mounted for slidable movement in said third cavity, and a recess in said spool in fluid communication with said outlet.

3. A valve as defined in claim 1, wherein said valve means is a first spring biased poppet normally urged in seating relation against one end of said second cavity, and said hollow piston type valve means is a second spring biased poppet normally urged in seating relation against the other end of said second cavity.

4. A valve as defined in claim 3, said second poppet comprising a hollow piston having a cylindrical side wall, said opening in said hollow piston type valve means being an orifice formed in said cylindrical side wall.

5. A valve as defined in claim 4, wherein said vent in said valve body communicates with said second cavity at said other end thereof, and said second poppet is disposed between said second cavity and said vent.

6. A valve as defined in claim 1, including means forming a third cavity in said valve body between said first and second cavities, said outlet communicating with said third cavity, said connection between said piston and said valve means being a spool mounted for slidable movement in said third cavity and having a length greater than the length of said third cavity, and a recess in said spool in fluid communication with said outlet, and wherein said valve means is a first spring biased poppet normally urged in seating relation against one end of said second cavity, and said hollow piston type valve means is a second spring biased poppet normally urged in seating relation against the other end of said second cavity.

7. A valve as defined in claim 6, said second poppet comprising a hollow piston having a cylindrical side wall, said opening in said hollow piston type valve means being an orifice formed in said cylindrical side wall.

8. A valve as defined in claim 7, wherein said vent in said valve body communicates with said second cavity at said other end thereof, and said second poppet is being disposed between said second cavity and said vent.

9. A valve which comprises a valve body, means forming a first cavity in said valve body at one end portion thereof, means forming a second cavity in said valve body in the other end portion thereof, means forming a third necked down cavity interconnecting said first and second cavities, a piston mounted for slidable axial movement in said first cavity, a spring normally urging said piston inwardly toward one end of said third cavity, a first port in said valve body communicating with said first cavity on one side of said piston, a first poppet and a second poppet both positioned for slidable axial movement in said second cavity, compression spring means normally urging said poppets towards opposite ends of said second cavity, a seat for said first poppet at one end of said second cavity adjacent the periphery of said third cavity, an outlet from said valve body in fluid communication with said third cavity, a spool mounted for slidable movement in said third cavity, and having a length greater than the length of said third cavity, a recess in said spool in fluid communication with said outlet, said second poppet having a cylindrical side wall formed integral therewith, a second port in said valve body adjacent said second poppet, a vent in said valve body in fluid communication with said second cavity and said second port, a seat for said second poppet at the other end of said second cavity adjacent the periphery of said vent, and an orifice in the cylindrical wall of said second poppet providing fluid communication between said second port and said second cavity.

10. A valve which comprises a valve body, means forming a first cavity in said valve body at one end portion thereof, means forming a second cavity in said valve body in the other end portion thereof, means forming a third necked down cavity interconnecting said first and second cavities, a piston mounted for slidable axial movement in said first cavity, a spring normally urging said piston inwardly toward one end of said third cavity, means for adjusting the compression of said spring, a first port in said valve body communicating with said first cavity on one side of said piston, a first poppet and a second poppet both positioned for slidable axial movement in said second cavity, a compression spring positioned between said first and second poppets and normally urging said poppets towards opposite ends of said second cavity, a seat for said first poppet at one end of said second cavity adjacent the periphery of said third cavity at the other end thereof, an outlet from said valve body in fluid communication with said third cavity, a spool mounted for slidable movement in said third cavity, and having a length greater than the length of said third cavity, a recess in said spool in fluid communication with said outlet, said second poppet having a cylindrical side wall formed integral therewith, a second port in said valve body adjacent said second poppet, a vent in said valve body in fluid communication with said second cavity and said second port, a seat for said second poppet at the other end of said second cavity adjacent the periphery of said vent, and an orifice in the cylindrical wall of said second poppet providing fluid communication between said second port and said second cavity.

11. In combination, a valve which comprises a valve body, means forming a first cavity in said valve body, a biased piston mounted for slidable movement in said first cavity, a first port in said valve body communicating with said first cavity on one side of said piston, means forming a second cavity in said valve body, an outlet from said valve body, a biased valve means between said second cavity and said outlet, a positive mechanical connection between said piston and said valve means, a second port in said valve body, a vent in said valve body in fluid communication with said second port, a biased hollow piston type valve means in said second cavity between said second port and said vent, and an opening in said hollow piston type valve means providing fluid communication between said second port and said second cavity, said opening being smaller than said outlet, a safety brake actuator comprising a spring biased diaphragm, means forming an air chamber on one side of said diaphragm, and a brake rod connected to said diaphragm, and means providing fluid communication between said second port of said valve and said air chamber of said actuator.

12. In combination, a valve which comprises a valve body, means forming a first cavity in said valve body, a biased piston mounted for slidable movement in said first cavity, a first port in said valve body communicating with said first cavity on one side of said piston, means forming a second cavity in said valve body, an outlet from said valve body, a biased valve means between said second cavity and said outlet, a positive mechanical connection between said piston and said valve means, a second port in said valve body, a vent in said valve body in fluid communication with said second port, a biased hollow piston type valve means in said second cavity between said second port and said vent, and an opening in said hollow piston type valve means providing fluid communication between said second port and said second cavity, said opening being smaller than said outlet, and a safety brake actuator comprising a spring biased diaphragm, means forming an air chamber on one side of said diaphragm, and a brake rod connected to said diaphragm, and means providing fluid communication between said second port of said valve and said air chamber, a source of air pressure, a supply line connected to said pressure source, a first conduit connecting said supply line and said first port, a second conduit connecting said supply line and said second port, and a check valve in said second conduit permitting passage of air from said supply line to said second port but not in the reverse direction, said first conduit being connected to said supply line upstream from said check valve, said check valve being bypassed by said first conduit.

References Cited in the file of this patent
UNITED STATES PATENTS

| | | |
|---|---|---|
| 2,038,162 | Cadman | Apr. 21, 1936 |
| 2,447,713 | Newell | Aug. 24, 1948 |
| 3,011,834 | Casey | Dec. 5, 1961 |